United States Patent Office 3,412,439
Patented Nov. 26, 1968

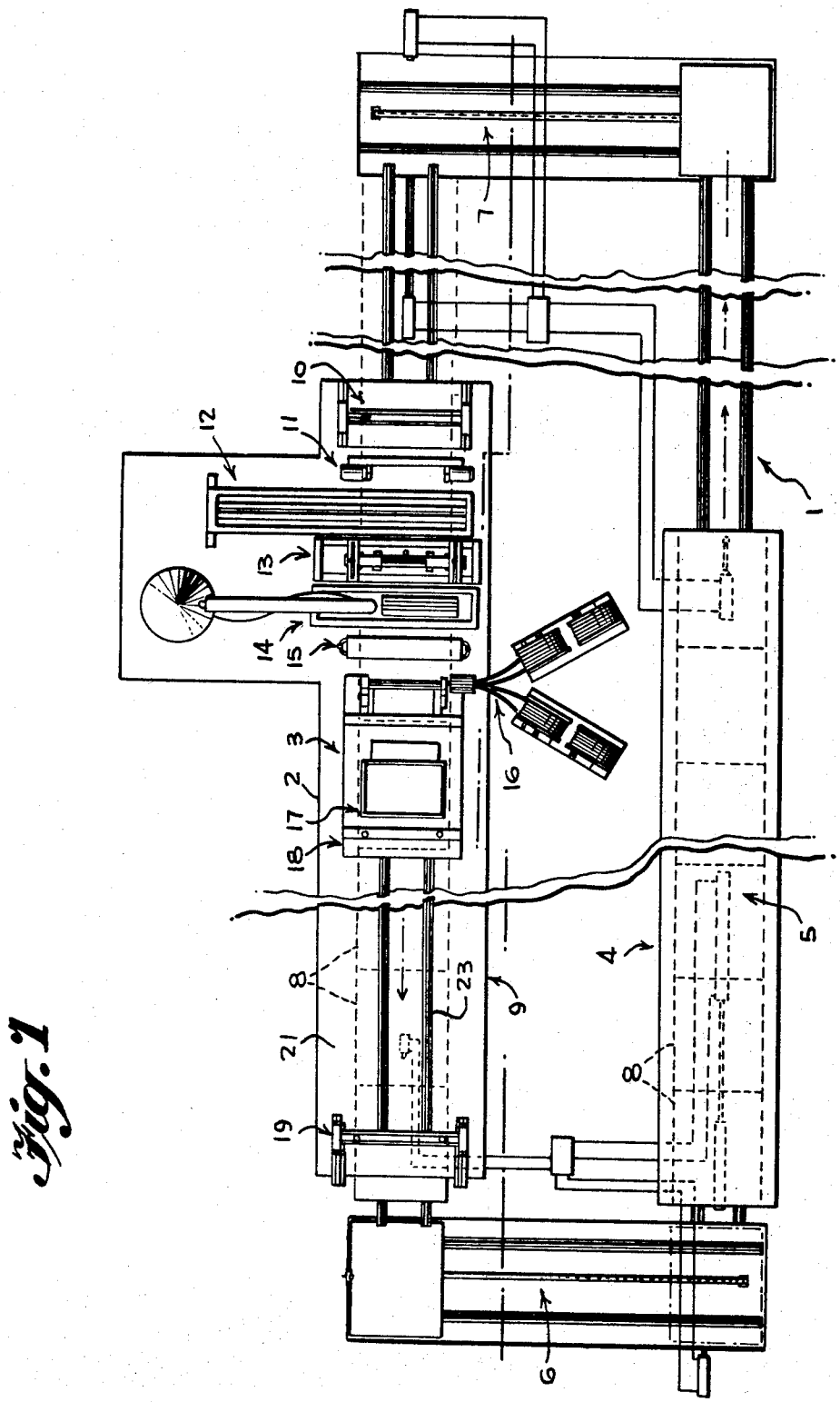

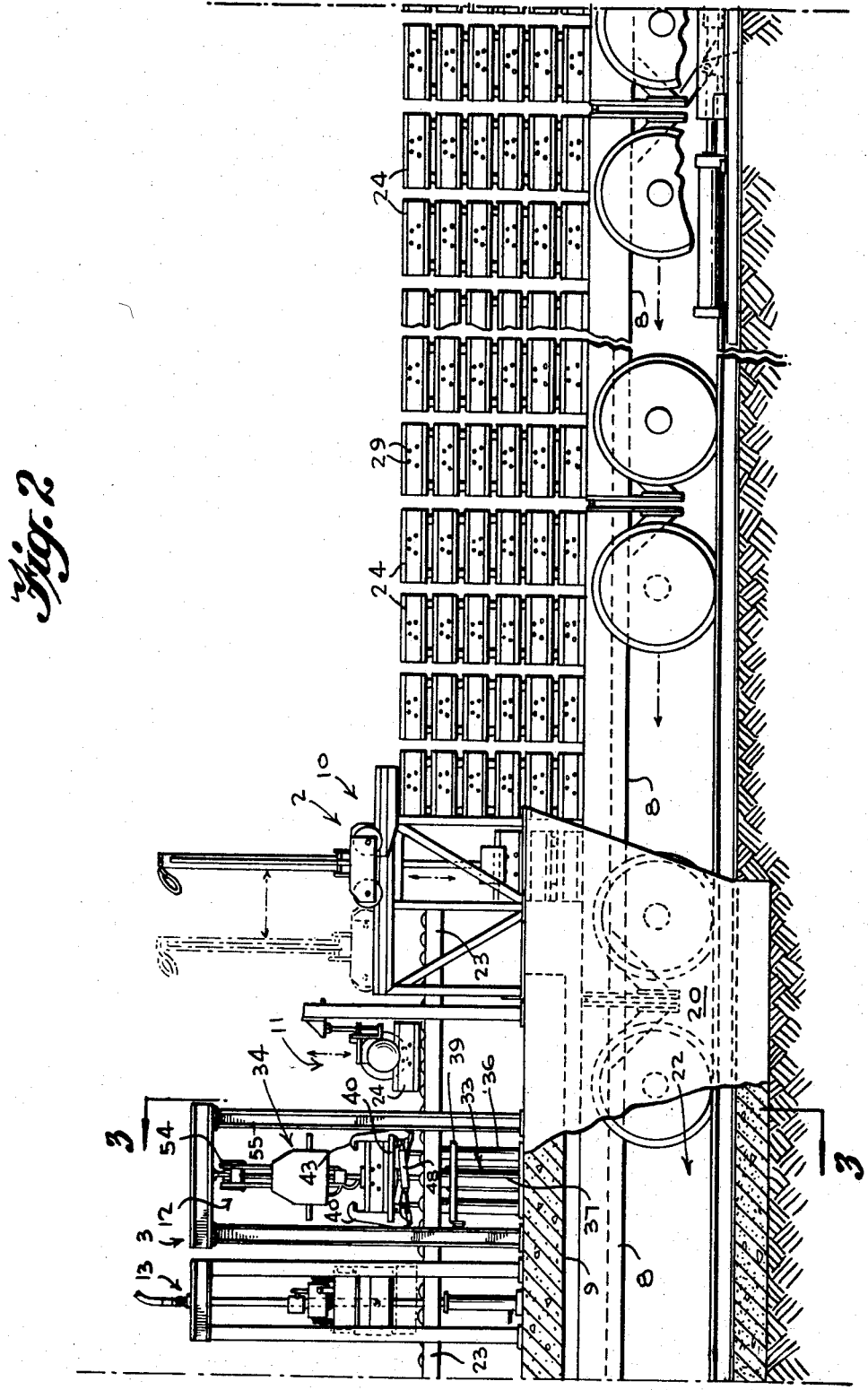

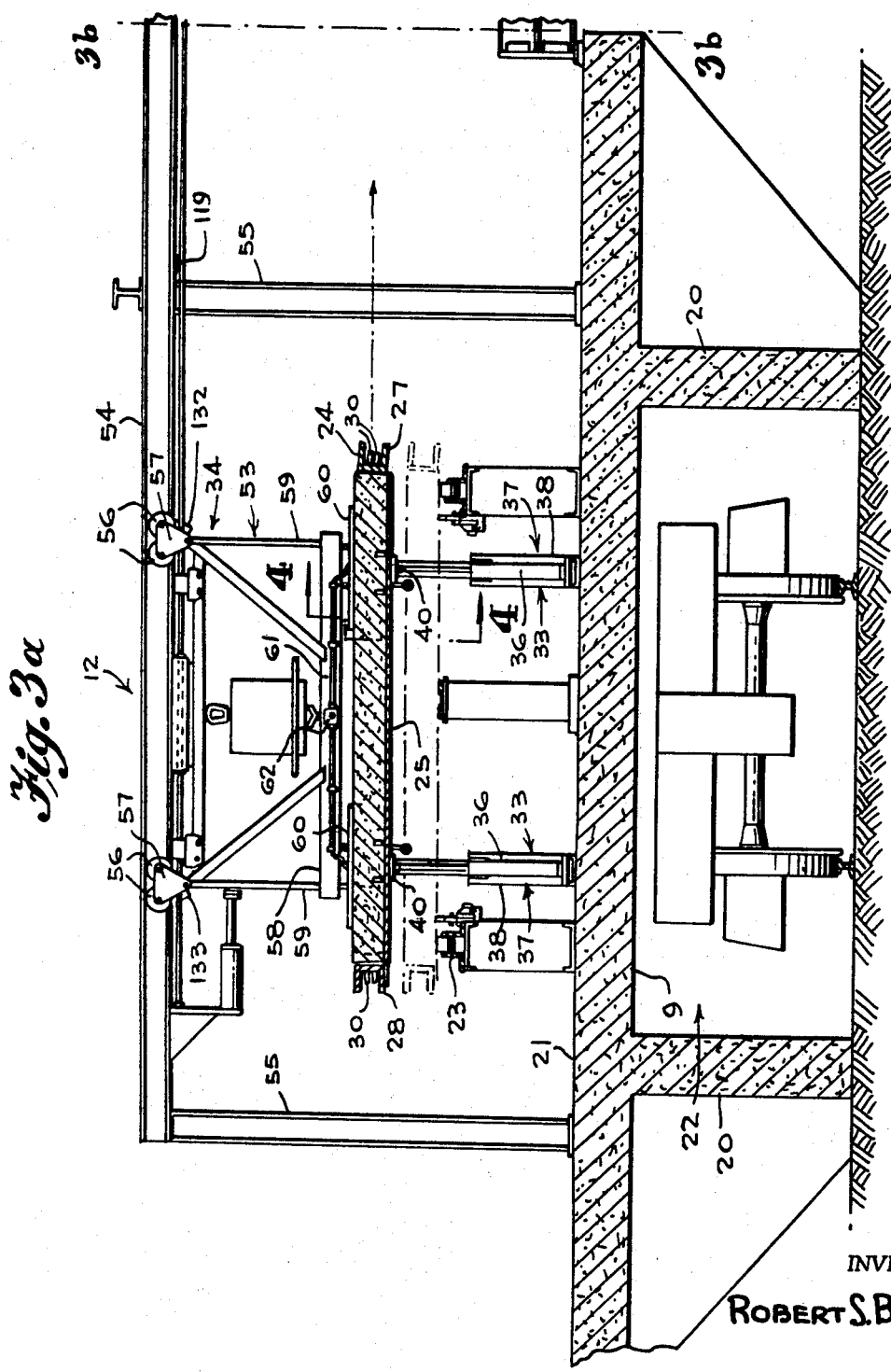

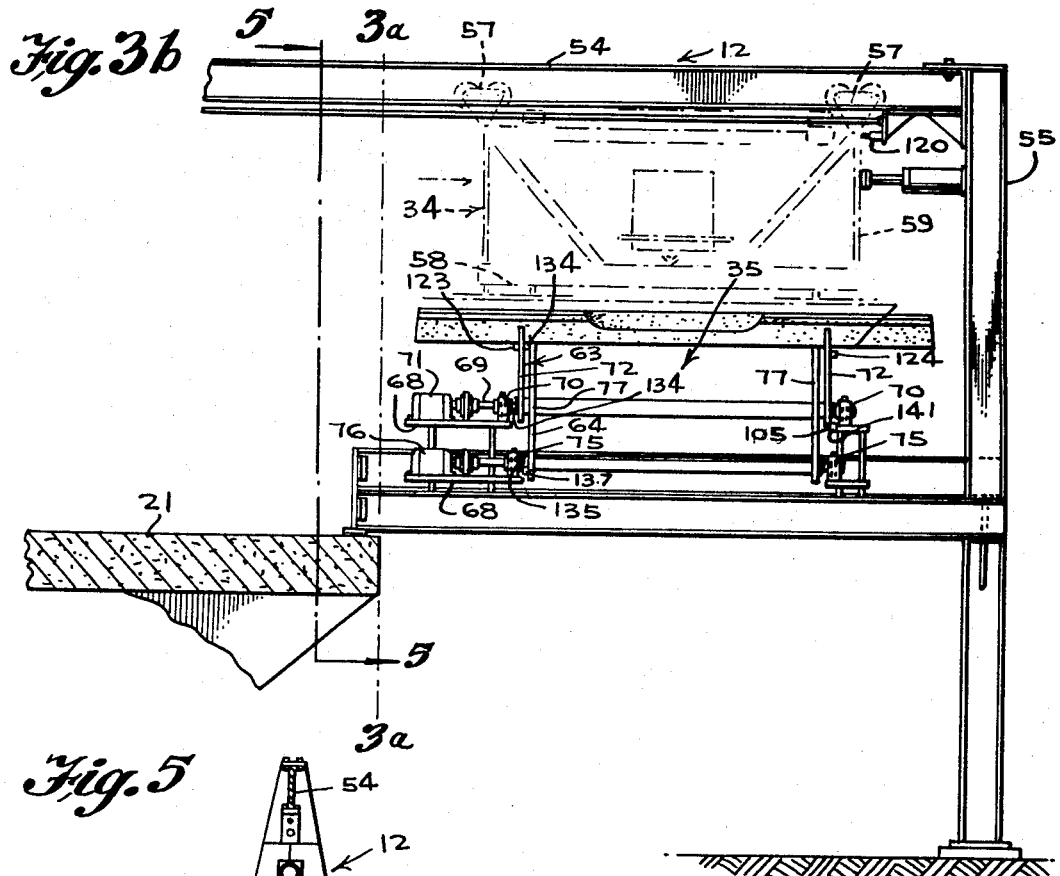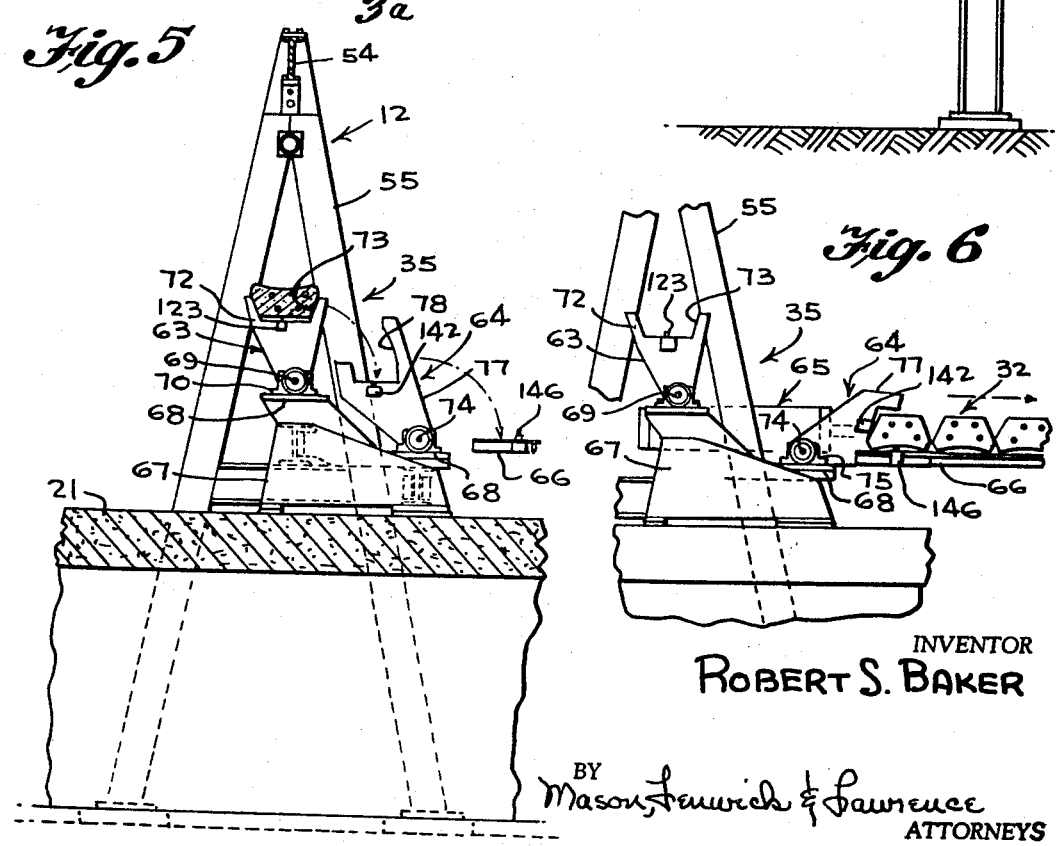

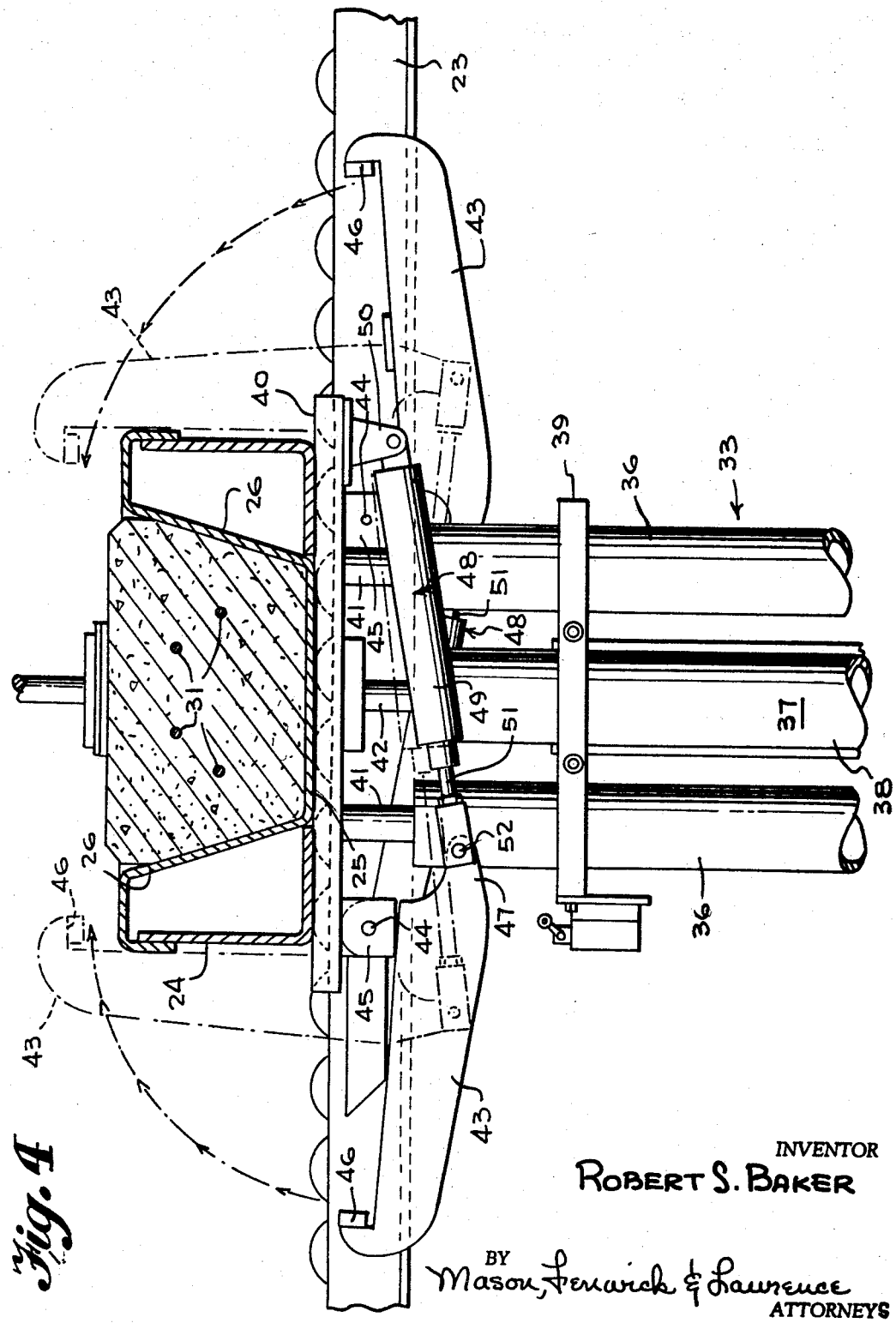

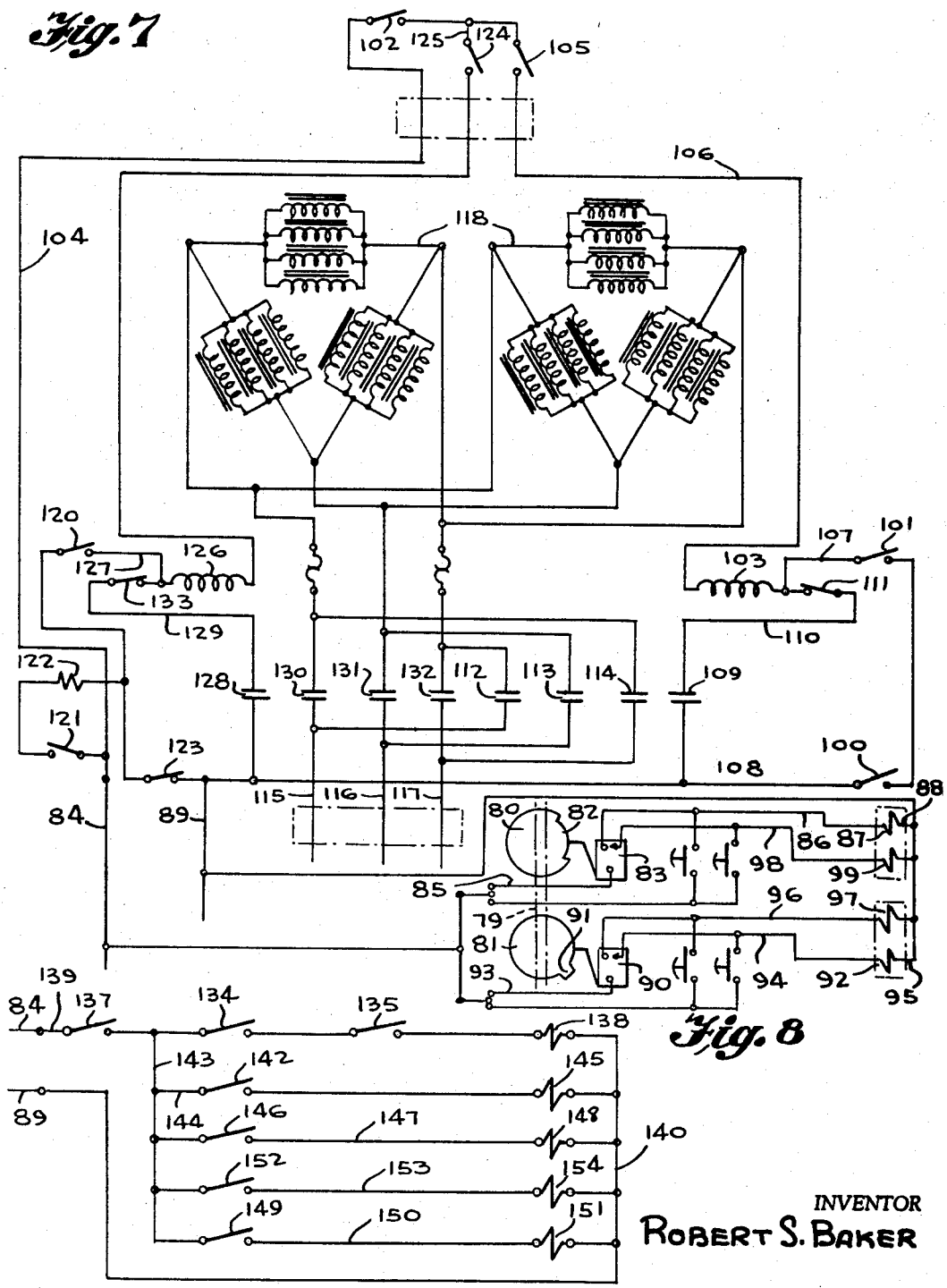

3,412,439
APPARATUS FOR REMOVING CONCRETE ARTICLES FROM PALLETS AND INVERTING SAID ARTICLES
Robert S. Baker, Tampa, Fla., assignor, by mesne assignments, to American Concrete Crosstie Corporation, Tampa, Fla., a corporation of Florida
Original application Feb. 11, 1964, Ser. No. 344,095, now Patent No. 3,305,907, dated Feb. 28, 1967. Divided and this application Feb. 27, 1967, Ser. No. 618,745
3 Claims. (Cl. 25—1)

ABSTRACT OF THE DISCLOSURE

Apparatus to separate cured concrete members from pallets in which they are formed and cured and transport them to an accumulating area, wherein there is a carriage with means to grip the members and there is means to hold the pallet against movement during separation of the members, and the carriage transports the members to one or more member-inverting cradles at the accumulating area, the operating sequence being automatically and electrically controlled.

Cross-reference to related application

This application is a division of co-pending application of Robert S. Baker, S.N. 344,095, filed Feb. 11, 1964, now Patent No. 3,305,907, for machine for making prestressed concrete members.

Background of the invention

This invention relates to apparatus for removing elongated concrete members from pallets in which they were formed and cured, and particularly to such apparatus for use in connection with machines for automatically making prestressed concrete articles.

In the above mentioned copending application, a machine is disclosed for automatically making prestressed concrete members. The machine includes a platform along which pallets are advanced to stations for inserting stressing cables in the pallets and anchoring them therein, for stressing the cables, for pouring and molding the concrete member, for transferring the molded member on its pallet to a transporting car for passage through a curing tunnel, for loading the cured pallet back onto the platform, for cutting the cables to free the cored member from the pallet, and for removing the cured member from the pallet. The operation is continuous and automatic.

The present invention is concerned only with the apparatus for removing the cured concrete members from the pallets. Reference may be had to the copending application for a complete disclosure of the machine for forming prestressed concrete members.

Summary of the invention

The principal object of the present invention is to provide means for removing cured concrete members from the pallets on which they have been formed and cured, and to move them to a place of storage.

Another object of the invention is to provide means to lift a concrete member from the pallet, to transport the member from the path of pallet movement and to deposit the member in a position for removal from the machine.

A still further object of the invention is to provide concrete member removing apparatus of the type mentioned, which will invert the concrete member before depositing it for removal from the machine.

Yet another object is to provide concrete member removing apparatus which will be automatic in its operation upon arrival of a loaded pallet at the removal station.

Other objects of the invention will become apparent from the following description of one practical embodiment thereof, when taken in conjunction with the drawings which accompany, and form part of, this specification.

Brief description of the drawings

FIGURE 1 is a schematic plan view illustrating the lay-out of the entire prestressed concrete forming machine, and showing the position of the concrete member removing apparatus with respect to the other parts of the machine;

FIGURE 2 shows in side elevation that portion of the machine which includes the concrete member removing apparatus;

FIGURES 3A and 3B together show a section through the machine at the concrete member removing station, and are taken on the line 3—3 of FIGURE 2;

FIGURE 4 is an enlarged section taken on the line 4—4 of FIGURE 3A, showing a portion of the mechanism for removing cured concrete members from pallets in which they were formed;

FIGURE 5 is taken on the line 5—5 of FIGURE 3B and shows in end elevation the mechanism for inverting cured concrete members and placing them on means to transport them from the machine;

FIGURE 6 is a view similar to FIGURE 5, showing the mechanism at the end of its concrete member inverting movement;

FIGURE 7 is a diagrammatic view of the circuits controlling the means for removing concrete members from pallets; and FIGURE 8 is a diagrammatic view of the control circuits for the means for inverting the concrete members.

Description of the preferred embodiment

Referring first to FIGURE 1, there is shown diagrammatically a plan of the entire apparatus with which the cable cutting mechanism of the present invention is particularly designed for use. It consists of a rectangular orbit, or path, 1 for a pallet transporting means. The transporting path includes a leg 2 along and above which a concrete member forming machine 3 is located, and a parallel leg 4 substantially the whole length of which is enclosed by a curing tunnel 5. Connecting the ends of the legs 2 and 4, and completing the orbit are transfer pits 6 and 7 along which transporting cars 8 are shifted from the forming machine leg 2 of the orbit to the tunnel leg 4, and from the tunnel leg to the forming machine leg.

The concrete member forming machine has a base 9 forming a bridge over the leg 2 of the transport path, and a platform upon which various stations, where the several required operations are performed, are located. These include (starting at the right end of the machine as shown in FIGURE 1) a pallet receiving station 10, the cable cutting station 11, a concrete member removal station 12, a pallet header cleaning station 13, a pallet cleaning station 14, an anchor inserting station 15, a cable laying station 16, a cable stressing station 17, a molding and vibrating station 18, and a loaded pallet delivery station 19.

The base 9 is formed of a pair of longitudinally extending, horizontally spaced, vertical walls or legs 20, with a flat platform 21 resting upon the tops of the legs. The legs, and the portion of the platform which bridges the legs, forms a tunnel 22 through which the transporting kiln cars 8 move. The platform is sufficiently broad to project some distance beyond the legs on either side of the tunnel. It is upon this platform that the various operating stations, including the cable cutting station, are mounted.

Pallet tracks 23 are mounted on the platform 21, and extend the full length of the platform. The track, and the means for moving pallets along the track, can be any appropriate type, and one specific track and pallet moving means is described in detail in the above mentioned copending application.

The pallet 24, in which the concrete member is formed, and which forms a transporting receptacle for the member, is an elongated, trough-shaped member having a flat bottom 25 and upwardly diverging side walls 26. The ends are formed by headers 27 and 28 which span the ends of the trough-shaped member. Header 27 is rigidly fixed to the trough end, while header 28 is a movable one having no permanent connection to the trough. The movable header is moved outwardly and held in its moved position to stress the cables as described in detail in the copending application. Each header has a plurality of cable openings 29, and a cable anchor 30 is attached to the header in alignment with each of the openings. When the cables are inserted in the openings they will be held by the anchors during stressing and throughout the concrete member forming and curing operations. Although the cable openings may have any desired pattern, each header is shown as having four openings as seen in FIGURE 2.

After the concrete members are formed on the pallets, they are moved to, and through, the curing tunnel 5 and then transferred back to the machine leg of the apparatus. The pallets, with the cured concrete members, are unloaded from the cars and onto the pallet track at the pallet receiving station, and then moved along the pallet track until they arrive at the cable cutting station 11. Here, the cables 31 are cut free from the headers, so that the cable tension is released to the cured concrete member, and the member is free to be removed from the pallet.

As soon as the cables have been cut, the pallet is advanced along the pallet track to the removal station 12 where the cured member, now freed from the pallet headers, is removed from the pallet. After being lifted from the pallet, the member is transported to an accumulating area 32. The member removal mechanism consists of elevators 33, mounted upon platform 21, a transporting trolley 34 and a member turn-over assembly 35 which enables the concrete members, that were cast upside down, to be placed right side up in the accumulating area.

There are two elevators 33, one adjacent each rail of the pallet track 23, with the two being between the pallet track rails. Each elevator consists of a pair of parallel, vertical guide tubes 36 mounted upon the platform 21. A cylinder assembly 37 is mounted between the guide tubes, and a cylinder 38 and the guide tubes 36 are suitably joined by connectors 39. Elevator platform 40 has a pair of depending rods 41 slidable in the guide tubes 36. The piston rod 42 of the cylinder assembly is connected to the elevator platform, so that the platform will rise and fall as the piston rod is extended and retracted.

The elevator platform carries a pair of pallet engaging arms 43 pivotally connected at 44 to brackets 45 beneath the platform edges. The arms have horizontal inoperative positions (see full line positions, FIG. 4) and vertical positions in which they grip the pallet sides to hold the pallet while a concrete member is being removed. Each arm has a hooklike end 46, remote from the pivots 44, to overlie the upper surfaces of pallets at the removal station when the arms are raised to upright, operative position. The arms have projecting ends 47, which form operating levers and are connected to control cylinder assemblies 48. The cylinders 49 of these assemblies are connected to brackets 50 at the opposite sides of the elevator platform 40 from the arms they control. Piston rods 51 are pivotally connected at 52 to the operating levers 47. Operation of the cylinder assemblies will cause the arms to move to and from operative, pallet-engaging position.

The transporting trolley 34 includes a carriage 53 movable along an overhead rail 54, supported from the platform 21 by means of standards 55. The rail can be an I-beam, and the carriage will have rollers 56 movable along the bottom flange of the beam. The rollers are shown mounted in trucks 57 and the carriage body 58 is suspended by hangers 59 from the trucks. The carriage body may take any desired form. It may be an elongated member, extending the major portion of the length of the concrete member to be lifted. One or more vacuum heads 60 are mounted beneath the body, for engagement with a concrete member to be moved from a pallet on the elevators 33. The vacuum head will be connected to a suitable vacuum source, not shown, by pipeline 61 controlled by valve 62.

When a concrete member has been engaged by the vacuum heads, the elevators will be lowered, leaving the member suspended from the trolley carriage. The trolley carriage may then move along the rail 54, carrying the member from the pallet track to a position at one side of the machine adjacent the accumulation area 32. The trolley carriage is powered by linear actuators to be described. At the end of the trolley path, the concrete member is transferred from the carriage to the turn-over assembly 35.

The turn-over assembly consists of two mechanisms to turn the concrete member in two stages. The first stage mechanism 63 is in the form of a cradle which receives the member from the trolley carriage and turns it 90° while delivering it to the second stage mechanism 64. The second stage is another cradle which rocks 90° and completes the inversion of the concrete member as it delivers it to the accumulating area 32. A cylinder assembly 65 at the edge of the accumulating area pushes the member from the second stage mechanism onto a storage space or onto a suitable conveyor 66 which may be used to carry the member from the machine.

The turn-over mechanism is mounted upon a frame 67 which includes seats 68 at the sides. The first stage 63 has a shaft 69 journaled in bearings 70 on the seats 68. A reversible power means 71 is mounted upon one of the seats and connected to the shaft. Near the ends of the shaft, there are upstanding plates 72, each having a cradle recess 73 at its upper edge to receive a concrete member. The recess shape will be such that it will closely embrace the sides of the member.

The second stage 64 also has a shaft 74, journaled in bearings 75 on the seats 68. A power means 76 is connected to the shaft. Shaft 74 has upstanding plates near its ends, which have recesses 78, shaped to receive the concrete member when turned on its side. The recesses of the second stage mechanisms are locted so as to lie in the arcuate path of travel of concrete members in the first stage cradle, so that the concrete members will come to rest in the recesses 78 of the second stage mechanism as the first stage is rocked about its shaft axis.

Operation of the various mechanisms at the unloading station 12 is initiated by two cams on a master cam shaft 79. A cam 80 controls operation of the concrete member engaging arm 47, and a cam 81 controls operation of the elevators. The remaining operations are controlled by movement of the various parts of the mechanism, or the movement of the concrete member from place to place.

Cam 80 has a recess 82 into which switch arm 83 will drop shortly after the cam cycle of rotation begins. When the switch arm drops in the recess, it closes a circuit from line 84 through line 85, switch 83, line 86, solenoid coil 87 of valves controlling cylinders 49, to cause the piston rods to extend to swing the arms 43 vertically, and line 88 to return line 89. This will bring the arms 43 up along the sides of the pallet to insure its proper position and cause the hook ends of the arms to overlie the pallet side edges. Cam 81 will then operate to move its switch 90, by contact with cam rise 91, to close a circuit through the solenoid 92 controlling upward movement of the elevator cylinder 38. This circuit is from line 84, through line 93, switch 90, line 94, solenoid 92 and line 95 to line 89. The elevators will rise, carrying the pallet and concrete member upwardly until the concrete member is pressed tightly against the vacuum heads 60.

After a short pause, long enough for proper vacuum to build up, cam 81 will release switch 90, and the switch will move to its opposite position making contact with line 96 which connects to solenoid coil 97 controlling downward movement of cylinder 38. If there is no adhesion between the concrete member and the pallet, the pallet will fall free from the elevators. If the pallet sticks, arms 43 will pull it from the concrete member as the elevators lower. After the elevators reach their position of rest and the cam cycle is almost completed, cam 80 will cause switch 83 to close with line 98 connected to solenoid coil 99 to lower the arms 43 to inoperative position.

When the concrete member reached its upper position in contact with the vacuum heads, it closed a switch 100 on the trolley carriage. When the carriage is in position to receive a concrete member, it holds closed a switch 101 on the trolley rail 94 (see FIG. 7). When the empty pallet is replaced on the pallet track, it closes a switch 102 on the pallet track. These three switches, 100, 101 and 102, are in a circuit with a starter relay coil 103 for the three-phase twelve coil, lineal actuators which cause the movement of the trolley carriage along its rail. Starter coil 103 initiates movement from the member receiving position at the elevators to turn-over mechanism. The circuit for coil 103 includes a line 104 from line 84, switch 102, a switch 105 located at the turn-over mechanism first stage indicating that mechanism is in position to receive the concrete member, line 106, coil 103, line 107 including switch 101 and switch 100, and line 108 to return line 89. Energizing coil 103 closes relay contacts 109 establishing a holding circuit from coil 103 to line 108 through line 110 by-passing switches 101 and 100. The holding circuit includes a switch 111 mounted in the trolley carriage to cut off the linear actuators at predetermined time. Starter relay contacts 112, 113 and 114 are in the heavy duty lines 115, 116 and 117 supplying the lineal actuators 118.

As the trolley carriage moves along its track, a cam 119, mounted on the rail 54 at about its middle, strikes switch 111 and opens the holding circuit through relay coil 103. As switch 101 opened when the carriage left the elevator station, coil 103 will be de-energized and the lineal actuators will be cut off. The trolley carriage will coast into the turn-over station.

When the trolley carriage arrives at the turn-over station it closes switch 120 on the rail 54. It also closes a switch 121 on the rail which is in circuit with a coil 122 of valve 62 controlling the vacuum heads 60. Closing switch 121 will reease the vacuum allowing the concrete member to drop from the carriage to rest in the cradle recesses 73 in the first turn-over station plates. The recesses are in alignment with the path of the concrete member travel on the trolley carriage, so that the member is carried endwise into the recesses by the carriage. Thus, it need drop but a very short distance when released by the vacuum heads to seat in the cradle.

As the concrete member drops from the carriage, switch 100 opens. When the member seats in the cradle recesses 73, it closes switches 123 and 124, both mounted on the cradle plates 72. As switches 120 and 102 are already closed a circuit through line 104, switch 102, line 125, switch 124, starter relay coil 126, line 127, switches 120 and 123 is closed. This closes relay contacts 128 in holding circuit 129 and closes relay contacts 130, 131 and 132 in linear actuator feed lines 115, 116 and 117 to energize the actuators in reverse direction and start the trolley carriage back toward the elevator station. On the return trip, switch 133 in holding circuit 129 strikes cam 119 to de-energize coil 126. This will de-activate the linear actuators. When the carriage left the turn-over station, switch 120 opened, and when the trolley is correctly positioned at the elevator station, switch 101 is closed.

When the concrete member was placed in the cradle of the turn-over first stage, it closed a switch 134, located on the cradle plate 72 (see FIG. 8). A switch 135, mounted on the shaft 74 of the second stage, strikes an abutment 136 on the support seat 68 when the second stage is in proper member-receiving position. A third switch 137, located on the trolley rail 54 is closed by the carriage when at the elevator station. With these three switches closed, a hydraulic valve coil 138 is energized to start power means 71 to rock the first stage cradle toward the second stage. The coil circuit is from line 84 through line 139, the three switches and line 140 to return line 89. As the first stage cradle rocks, a switch 105 on shaft 69 leaves at abutment 141 on seat 68 and opens so that the trolley carriage cannot move from the elevator station until the first stage cradle returns to upright, concrete member receiving position.

When the first stage cradle reaches the second stage cradle, the load of the member is taken by the second stage. As the member moves into the recesses of the second stage cradle, switch 142, mounted on the cradle plate 79 adjacent the recess, will be closed. This closes a circuit from wire 139 through wires 143, 144, switch 142, coil 145 and return line 140. Coil 145 controls power means 76 to rock the second stage cradle toward the accumulating area 32. As the second stage cradle starts its rocking movement, switch 134 on the first stage cradle plate opens as the concrete member is moved out of the first stage cradle.

The rocking movement of the second stage cradle carries the concrete member to the accumulating area. As the member is placed on the area, it closes switch 146 on the area in line 147 bridged between lines 143 and 140. This line includes valve coil 148 controlling reverse movement of the power means 71 of the first stage. When the first stage returns to its original position, it again closes switch 105 in the trolley carriage control circuit. A second switch 149 on the accumulating area is also closed when the member is placed there. This switch is in circuit through line 150 with a solenoid coil 151 controlling the valve of cylinder assembly 65, and when switch 149 is closed the cylinder will operate to push the concrete member from the second stage cradle onto the conveyor 66. As the member moves off the switch 149, the switch opens and the cylinder automatically returns to its inoperative position. As the member leaves the second stage cradle, switch 142 opens, breaking the circuit to the second stage power means. When the member is pushed onto the conveyor, a switch 152 is closed which is in line 153 to valve coil 154 controlling reverse movement of the second stage cradle. The return of the second stage to its original position closes switch 135 on the second stage shaft, to set up the circuits to repeat the cycle.

When the empty pallet was returned by the elevators 33 to the pallet track, it was in position to be moved by the next step of the pallet advancing mechanism, not shown, to the pallet header cleaning station 13 to begin another cycle of operation.

In view of the detailed description of the operation of the mechanism given in conjunction with the description of the structure and its controls, it is not thought necessary to re-state the operation of the apparatus as a whole.

While in the above one practical embodiment of the invention has been disclosed, it will be understood that the details of structure shown and described are merely by way of illustration, and the invention may take other forms within the scope of the appended claims.

I claim:

1. Apparatus for removing concrete members from pallets at a pallet position comprising, a rail over the pallet position, a carriage movable along the rail to a position overlying pallets at the pallet position and to a position removed therefrom, means to move the carriage along the rail, means on the carriage to grip cured concrete members, an elevator at the pallet position on which pallets rest to lift pallets to bring the cured members into engagement with the gripping means on the carriage and to lower the pallets leaving the cured members held by the carriage, means carried by the elevator to secure pallets to the elevator to positively pull the pallets from cured members held by the carriage, and means for inverting cured members including a pair of member-receiving cradles, a first cradle located adjacent the position of the carriage removed from the pallet position to receive cured members and movable to turn the cured members a quarter turn, and a second cradle located to receive members from the first cradle after the quarter turn and movable to turn the members an additional quarter turn to complete the inversion.

2. Apparatus for removing concrete members from pallets as claimed in claim 1 wherein, there are control means to initiate operation of the apparatus and cause sequential operation of the elevator, gripping means, carriage and inverting means.

3. Apparatus for removing concrete members from pallets as claimed in claim 2 wherein, the control means to cause sequential operation of the respective members includes means operated by contact with the concrete member.

References Cited

UNITED STATES PATENTS

| 2,131,474 | 9/1938 | Henderson | 25—41 |
| 3,142,106 | 7/1964 | Wise et al. | 25—120 |
| 3,181,213 | 5/1965 | Schaible et al. | 25—120 |
| 2,431,618 | 11/1947 | Rayburn et al. | 214—89 |
| 2,554,118 | 5/1951 | Moser | 214—89 |

FOREIGN PATENTS 1,062,188  12/1953  France.

J. SPENCER OVERHOLSER, *Primary Examiner.*

ROBERT D. BALDWIN, *Assistant Examiner.*